(12) United States Patent
Chang et al.

(10) Patent No.: US 12,380,748 B2
(45) Date of Patent: Aug. 5, 2025

(54) SCHEME FOR SETTING/USING ELECTRONIC DEVICE AS KEYLESS DEVICE OF VEHICLE AND ADJUSTING DEVICES IN THE VEHICLE

(71) Applicant: PixArt Imaging Inc., Hsin-Chu (TW)

(72) Inventors: Yen-Min Chang, Hsin-Chu (TW);
Yi-Hsien Ko, Hsin-Chu (TW);
Nien-Tse Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 73 days.

(21) Appl. No.: 18/093,789

(22) Filed: Jan. 5, 2023

(65) Prior Publication Data
US 2023/0154257 A1   May 18, 2023

Related U.S. Application Data

(63) Continuation of application No. 17/369,891, filed on Jul. 7, 2021, now Pat. No. 11,580,802, which is a continuation of application No. 16/417,602, filed on May 20, 2019, now Pat. No. 11,087,573.

(51) Int. Cl.
| | |
|---|---|
| *G07C 9/00* | (2020.01) |
| *B60H 1/00* | (2006.01) |
| *B60R 25/24* | (2013.01) |
| *B60R 25/25* | (2013.01) |
| *G07C 9/25* | (2020.01) |
| *G07C 9/26* | (2020.01) |

(52) U.S. Cl.
CPC ..... *G07C 9/00309* (2013.01); *B60H 1/00742* (2013.01); *B60R 25/241* (2013.01); *B60R 25/25* (2013.01); *G07C 9/253* (2020.01); *G07C 9/257* (2020.01); *G07C 2009/00547* (2013.01); *G07C 9/26* (2020.01)

(58) Field of Classification Search
None
See application file for complete search history.

(56) References Cited

U.S. PATENT DOCUMENTS

| | | | | |
|---|---|---|---|---|
| 5,055,658 A | * | 10/1991 | Cockburn | G07C 9/00563 235/382 |
| 5,229,764 A | * | 7/1993 | Matchett | H04W 12/126 340/5.74 |
| 5,278,547 A | * | 1/1994 | Suman | G07C 9/00182 340/426.25 |
| 6,078,265 A | * | 6/2000 | Bonder | B60R 25/252 340/5.23 |
| 6,140,939 A | * | 10/2000 | Flick | G07C 9/00563 340/12.55 |

(Continued)

*Primary Examiner* — Carlos Garcia
(74) *Attorney, Agent, or Firm* — Winston Hsu (57) ABSTRACT

A portable electronic device to be used as a keyless device of a vehicle includes a controlling circuit which includes a physiological feature detection module and a processing circuit. The physiological feature detection module is used for detecting a physiological feature of a person. The processing circuit is coupled to the physiological feature detection module and used for determining whether the person is an authorized user of the vehicle according to the detected physiological feature of the person, and for opening a car door of the vehicle or starting the vehicle when the person is identified by the processing circuit as the authorized user.

6 Claims, 3 Drawing Sheets

(56) References Cited

U.S. PATENT DOCUMENTS

| | | | |
|---|---|---|---|
| 6,898,299 B1* | 5/2005 | Brooks | G07C 9/37 340/5.82 |
| 6,924,729 B1* | 8/2005 | Aschauer | G07C 9/00182 340/5.82 |
| 9,538,332 B1* | 1/2017 | Mendelson | H04W 48/10 |
| 2003/0200778 A1* | 10/2003 | Chhatwal | G07C 9/00309 70/408 |
| 2003/0204290 A1* | 10/2003 | Sadler | G06V 40/10 701/1 |
| 2004/0090121 A1* | 5/2004 | Simonds | B60R 16/0315 307/10.1 |
| 2005/0258936 A1* | 11/2005 | Ghabra | B60R 25/245 340/5.72 |
| 2008/0174451 A1* | 7/2008 | Harrington | G08B 21/06 340/905 |
| 2009/0061897 A1* | 3/2009 | Hamilton | G08G 1/20 340/5.1 |
| 2009/0184800 A1* | 7/2009 | Harris | G08C 17/02 340/5.21 |
| 2010/0039224 A1* | 2/2010 | Okude | B60R 25/305 340/5.83 |
| 2012/0283871 A1* | 11/2012 | Chai | H04L 9/3231 726/28 |
| 2013/0234827 A1* | 9/2013 | Tomita | G08C 23/04 340/5.61 |
| 2015/0028996 A1* | 1/2015 | Agrafioti | G06F 21/40 340/5.82 |
| 2015/0084750 A1* | 3/2015 | Fitzgibbon | G08C 17/02 340/12.29 |
| 2015/0127215 A1* | 5/2015 | Chatterjee | B60H 1/00642 701/1 |
| 2015/0288687 A1* | 10/2015 | Heshmati | H04L 67/10 726/7 |
| 2015/0332532 A1* | 11/2015 | Lee | G07C 9/00658 340/5.72 |
| 2016/0101783 A1* | 4/2016 | Abou-Nasr | B60W 40/08 340/5.82 |
| 2017/0127944 A1* | 5/2017 | Sun | A61B 5/01 |
| 2017/0352215 A1* | 12/2017 | Maiwand | G07C 9/00309 |
| 2018/0026808 A1* | 1/2018 | Scalisi | H04L 12/40169 340/5.5 |
| 2018/0041865 A1* | 2/2018 | Rabb | G08B 29/24 |
| 2018/0115897 A1* | 4/2018 | Einberg | H04W 12/04 |
| 2020/0073527 A1* | 3/2020 | Bandishti | G06F 3/0487 |
| 2020/0216025 A1* | 7/2020 | Le Bourgeois | B60R 25/241 |
| 2021/0335066 A1* | 10/2021 | Chang | G07C 9/00563 |

\* cited by examiner

SCHEME FOR SETTING/USING ELECTRONIC DEVICE AS KEYLESS DEVICE OF VEHICLE AND ADJUSTING DEVICES IN THE VEHICLE

CROSS REFERENCE TO RELATED APPLICATIONS

This application is a continuation application of U.S. application Ser. No. 17/369,891, filed on Jul. 7, 2021, which is a continuation application of U.S. application Ser. No. 16/417,602, filed on May 20, 2019. The contents of these applications are incorporated herein by reference.

BACKGROUND OF THE INVENTION

1. Field of the Invention

The invention relates to applications for a vehicle system, and more particularly to a portable electronic device, a wearable electronic device, and a temperature sensor.

2. Description of the Prior Art

Generally speaking, a person usually uses his physical car/automobile key to open/start a vehicle. However, the physical key may be stolen or lost, so that a car thief would open/start the vehicle if getting the physical key. It is not safe for the person carrying the physical key.

SUMMARY OF THE INVENTION

Therefore one of the objectives of the invention is to provide a portable electronic device or a wearable electronic device as a keyless device, and a temperature sensor, to solve the above-mentioned problems.

According to embodiments of the invention, a portable electronic device to be used as a keyless device of a vehicle is disclosed. The portable electronic device comprises a controlling circuit which comprises a physiological feature detection module and a processing circuit. The physiological feature detection module is used for detecting a physiological feature of a person. The processing circuit is coupled to the physiological feature detection module, and is used for determining whether the person is an authorized user of the vehicle according to the detected physiological feature of the person, and for opening a car door of the vehicle or starting the vehicle when the person is identified by the processing circuit as the authorized user.

According to the embodiments, a wearable electronic device to be used as a secondary keyless device of a vehicle is disclosed. The wearable electronic device comprises a controlling circuit which comprises a processing circuit. The processing circuit is used for sending a control signal to a vehicle system of the vehicle to open or start the vehicle when a person wearing the wearable electronic device is identified by the portable electronic device as an authorized user of the vehicle. The portable electronic device is used for detecting a physiological feature of the person, and for determining whether the person is the authorized user of the vehicle according to the detected physiological feature of the person.

According to the embodiments, a temperature sensor to be used in a portion of a car exterior device in a vehicle system of a vehicle is disclosed. The temperature sensor comprises a thermistor and an operational amplifier coupled to the thermistor. The operational amplifier is used for generating a temperature control signal to a processor of the vehicle system to make the processor adjust an in-car temperature of an air conditioner within the vehicle based on the temperature control signal that determines a difference between a specific temperature corresponding to a driver of the vehicle system and the in-car temperature.

According to the embodiments, an electronic device to be used for double checking whether a person is an authorized after the person uses a keyless device to open a door of a vehicle is disclosed. The electronic device comprises a controlling circuit comprising a physiological feature detection module and a processing circuit. The physiological feature detection module is used for detecting a physiological feature of the person. The processing circuit is coupled to the physiological feature detection module, and is used for determining whether the person is the authorized user of the vehicle according to the detected physiological feature of the person, and determining to start the vehicle or activating an in-car equipment of the vehicle only when the person is identified by the processing circuit as the authorized user as well as the person uses the keyless device to start the vehicle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
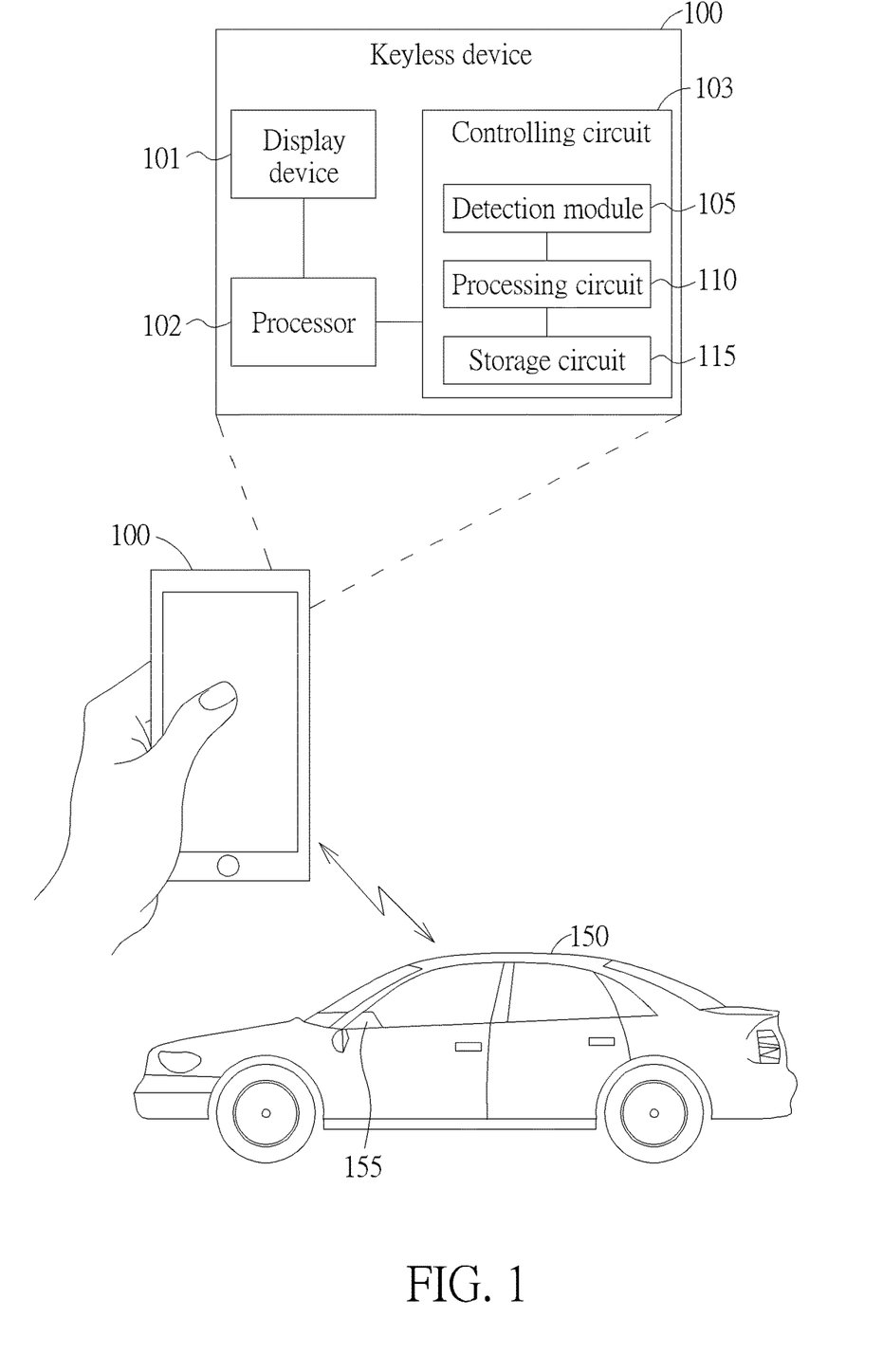
FIG. 1 is a diagram showing a person using a mobile/portable electronic device as a keyless device to replace the function of a car/automobile key to open and/or start a vehicle according to an embodiment of the invention.

FIG. 1 is a diagram showing a person using a mobile/portable electronic device 100 as a keyless device to replace the function of a car/automobile key to open and/or start a vehicle 150 according to an embodiment of the invention. The mobile/portable electronic device 100 is for example a mobile phone, a smart phone, a wearable electronic device such as a smart watch or a smart wristband/bracelet, and so on; in FIG. 1, the mobile/portable electronic device 100 for instance is a smart phone device (but not limited).

The person can set his smart phone 100 as a keyless device to replace the function of the car/automobile key and then can use the smart phone 100 to open/start the vehicle 150 without using or carrying the physical key, so that it is convenient for the person since the person does not need to take the physical key to open/start the vehicle 150 and also it will be not easy to lose the physical key.

In practice, the smart phone 100 to be used as a keyless device comprises a display device/panel 101, a processor 102 such as CPU, and a controlling circuit 103 which comprises a physiological feature detection module/circuit 105, a processing circuit 110, and a storage circuit 115.

The detection module 105 is used to detect a physiological feature of a person to generate physiological feature measurement signals for the person. The physiological feature for example comprises at least one of fingerprint pattern, face feature pattern, heart rate feature pattern, blood pressure feature pattern, handwriting feature pattern, voiceprint feature pattern, and so on, or comprises a combination of the above-described physiological feature patterns. The detection module 105 is arranged to perform at least one operation of an optical finger navigation, an voiceprint sensing/recognition operation, a capacitive fingerprint sensing/recognition operation, a handwriting sensing/recognition operation, and a face sensing/recognition operation. The detection module 105 can be arranged to detect at least one of a fingerprint feature, a voiceprint feature, a handwriting feature, and a face feature for the person. For example, the heart rate feature pattern or blood pressure feature pattern of each person is different and unique. The heart rate feature and blood pressure feature can be used to identify a specific person. The detection module 105 can perform the optical finger navigation to detect the heart rate feature and blood pressure feature of the person based on Photoplethysmography (PPG) detection technology to generate PPG measurement signals (or patterns) as the physiological feature measurement signals of the person.

In addition, the optical finger navigation for example can be used to detect the surface speckles of a fingerprint of a finger of a person, generate the frequency distribution of the speckles by performing a Fourier transform, obtaining high frequency component and low frequency component, and identifying a specific person based on the generated frequency components. The surface speckles of each person are different and unique. In addition, the handwriting feature, face feature, and fingerprint, and voiceprint features of different persons are different and unique.

The processing circuit 110 is coupled to the detection module 105, and is used to receive physiological feature measurement signals generated from the detection module 105, e.g. the PPG measurement signals of the person. If the person is currently identified as an authorized user such as a preset vehicle driver, the processing circuit 110 stores the PPG measurement signals of the person as PPG reference signals of the authorized user and record the PPG reference signals in a physiological feature database stored by the storage circuit 115. If the person is not identified as the authorized user, the processing circuit 110 is arranged to determine whether the person is equal to the authorized user by comparing the PPG measurement signals of the person with PPG reference signals of the authorized user in the physiological feature database. If the PPG measurement signals of the person exactly match the PPG reference signals of the authorized user, the processing circuit 110 decides that the person is equal to the authorized user.

In practice, the smart phone 100 may comprise a physiological feature generation mode and a physiological feature detection mode. For example, when the person is driving the vehicle or initially the person uses the physical key to start and sets the vehicle system 155 of the vehicle 150, the processing circuit 110 can be triggered by the person or triggered by the vehicle system 155 to control the smart phone 100 enter the physiological feature model generation mode. In this mode, the person is identified as an authorized user, and the detection module 105 is used to generate the physiological feature measurement signals of the person, e.g. PPG measurement signals, as PPG physiological feature reference signals of the person. The processing circuit 110 stores and records the physiological feature reference signals as reference signals of the authorized user in the database. After the model of the PPG reference signals have been generated and recorded in the database, the processing circuit 110 controls the smart phone 100 exit the model generation mode and enter the detection mode. In the detection mode, the detection module 105 is also used to generate the physiological feature measurement signals of the person, e.g. PPG measurement signals. The processing circuit 110 in the detection mode is arranged to compare the generated PPG measurement signals with PPG reference signals recorded in the database.

In addition, when the smart phone 100 enters the model generation mode, the processing circuit 110 is arranged to communicate with the vehicle system 155 in response to a control operation of the vehicle driver or in response to a request signal sent from the vehicle system 155.

The processing circuit 110 is arranged to establish a security connection with the vehicle system 155 by using a specific wireless connection technology standard such as the Bluetooth communication standard. The smart phone 100 and the vehicle system 155 form a piconet in which the smart phone 100 can be used as a slave device and the vehicle system 155 is used as a master device; alternatively, the smart phone 100 can be used as a master device and the vehicle system 155 is used as a slave device. The driver's smart phone 100 can be paired with the vehicle system 155 based on the Bluetooth communication standard. Once the pairing procedure successfully completes, a bond relationship forms between the smart phone 100 and the vehicle system 155 to enable those devices to connect to each other in the future without pairing again.

After the pairing procedure successfully completes, the detection module 105 of the smart phone 100 is triggered to sense the physiological feature of the vehicle driver to generate measurement signals as the PPG reference signals of the authorized user and store the PPG reference signals in the database of the storage circuit 115. After this, the smart phone 100 is configured as the keyless device of the vehicle 150 for the driver. Later, the vehicle driver may use the keyless device to open/start the vehicle 150 again if the driver leaves the vehicle 150, the car door of the vehicle 150 has been locked, and the driver forgets to carry the physical key. It should be noted that in the model generation mode the vehicle driver is automatically identified as an authorized user of the vehicle system 155. Thus, before entering the model generation mode, the vehicle system 155 can send a reconfirm message signal to the smart phone 100 to ask the vehicle driver operate the smart phone 100 to reconfirm whether to control the smart phone 100 enter the model generation mode before a certain timer expires, to provide high security protection.

After the smart phone 100 is configured as the keyless device of the vehicle 150 for the driver, the smart phone 100 is arranged to exit the model generation mode and enter the detection mode. In the detection mode, the processing circuit 110 controls the detection module 105 to sense a physiological feature of a person operating the smart phone 100 to generate PPG measurement signals of the person and then to compare the PPG measurement signals with the PPG reference signals of the authorized user to determine whether such person is the authorized user. If the person is not the authorized user, the person cannot use the smart phone 100 to open/start the vehicle 150 even though the smart phone 100 has been configured as the keyless device for the vehicle 150.

For example, when the vehicle driver which has been identified as the authorized user tries to use the keyless device (i.e. his smart phone 100) to open and star the vehicle 150, the detection module 105 of the smart phone 100 is arranged to detect and sense the physiological feature of the vehicle driver to generate the PPG measurement signals and then compare the PPG measurement signals with the PPG reference signals of the authorized user in the database to determine whether the measurement signals match to the PPG reference signals of the authorized user. In this situation, the processing circuit 110 detects that the measurement signals of the person match to the PPG reference signals of the authorized user and thus decides that the person is the authorized. The processing circuit 110 may notify the vehicle system 155 of such information based on the Bluetooth security connection in the dedicated piconet. When receiving such information via the Bluetooth communication, the vehicle system 155 is arranged to open the car door and/or is activated by the vehicle driver.

If the smart phone 100 is stolen by a car thief and the car thief tries to use the smart phone 100 to open/start the vehicle 150, the detection module also detects and senses the physiological features of the car thief to generate PPG measurement signals of the car thief, and the processing circuit 110 compares the PPG measurement signals of the car thief with the PPG reference signals of the authorized user in the database and thus would decide that the PPG measurement signals of the car thief do not match to the PPG reference signals of the authorized user. In this situation, the processing circuit 110 decides that other unauthorized persons try to open the car door and/or start the vehicle, and the car door is still locked and the vehicle system 155 is not activated by the car thief. Thus, even though the smart phone 100 as the keyless device is stolen by another person, such person cannot use or unlock the keyless device to open/start the vehicle since the physiological features of different persons are different and unique.

In addition, to avoid a person hacking information recorded in the smart phone 100 to drive away the vehicle, the physiological feature database can be built and stored within a storage space of the vehicle system 155. For example, when a person tries to use the smart phone 100 to open/start the vehicle 150, the processing circuit 110 is arranged to control the detection module 105 to detect and sense the physiological features of the person to generate PPG measurement signals and then send the PPG measurement signals to the vehicle system 155 via the Bluetooth security connection. A processor of the vehicle system 155 is used to compare the PPG measurement signals with PPG reference signals of the authorized user in the physiological feature database recorded in the storage space to decide whether the person is the authorized user. Then the vehicle system 155 can send the information of whether the person is equal to the authorized user back to the keyless device 100 via the same Bluetooth security connection. After receiving such information, the processing circuit 110 can obtain or know whether the person is the authorized user and may be arranged to control a display device 101 of the keyless device 100 to display such information on the display device 101.

In addition, the physiological feature database can be used to store and record multiple authorized users for the vehicle system 155 wherein the multiple authorized users may correspond to different/identical permissions (or permission levels). For example, the physiological feature database may store physiological feature reference information of two authorized users in which one person is the vehicle driver having a high permission level and the other person is a passenger having a low permission level. The vehicle driver can use the smart phone 100 as the keyless device to establish the security pairing connection with the vehicle system 155, and the detection module 105 detects the physiological feature measurement signals of the vehicle driver and stores the measurement signals as reference signals of the vehicle driver in the database when the pairing procedure successfully completes. The passenger can also use another smart phone as another keyless device with a low permission level to establish another security pairing connection with the vehicle system 155, and the detection module of the another keyless device detects the physiological feature measurement signals of the passenger and stores the measurement signals as reference signals of the passenger in the database when a pairing procedure successfully completes. Later, if the vehicle driver and passenger both leave the vehicle 150 and the car door of the vehicle system 155 has been locked, the passenger can use his smart phone which has been used as the keyless device to open the car door of the vehicle 100 and start other in-car equipment devices such as entertainment devices but cannot drive the vehicle 100 since the processing circuit 110 of the passenger's keyless device identifies the passenger as the authorized user having the lower permission level by comparing currently measured PPG signals of the passenger with the PPG reference signals in the database. Only the vehicle driver can use his smart phone 100 as a keyless device to open the car door of the vehicle 150, start other in-car equipment devices, and drive the vehicle 150. For instance, the driver's smart phone 100 and the vehicle system 155 form a first piconet in which the driver's smart phone 100 is a slave while the vehicle system 155 is a master, and the passenger's smart phone (not shown on FIG. 1) and the vehicle system 155 form a second piconet (different piconet) in which the passenger's smart phone is a slave while the vehicle system 155 is a master. That is, the vehicle system 155 can be arranged to allow multiple mobile devices as keyless devices.

Further, setting a mobile electronic device 100 such as a smart phone as a keyless device of the vehicle system 155 can effectively protect a car thief from driving away the vehicle 150. For example, the vehicle system 155 can be configured to open/start the vehicle 150 only when both conditions are satisfied wherein the both conditions are that an authorized user uses the physical key to open/start the vehicle 150 and the same user uses the keyless device 100 to open/start the vehicle 150. Thus, even though the physical key is stolen by a car thief, the car door of the vehicle 150 is kept locked when the car thief tries to use the stolen physical key to open/start the vehicle 150.

Further, when the person is identified as the authorized user, the person can use the keyless device 100 to automatically configure setting(s) of vehicle equipment device(s) in the vehicle 150. For example, when the authorized user tries to use the keyless device 100 to open the car door of the vehicle 150 or start the vehicle 150, the processing circuit 110 of the keyless device 100 can send information of the authorized user to the vehicle system 155 to trigger operation(s) of the vehicle system 155. The vehicle system 155 enters the drive mode. The vehicle system 155 may activate a particular vehicle equipment device during the drive mode of the vehicle system 155, and then may send a request signal from the vehicle system 155 to the authorized user's keyless device 100, e.g. the smart phone. Then, the keyless device 100 activates a user interface, e.g. on the display panel 101, which is arranged to ask the authorized user to determine or reconfirm whether to transmit a preset configuration from the keyless device 100 to the particular vehicle equipment device wirelessly based on the Bluetooth communication standard. When the authorized user confirms such message, in reply to the request signal from the vehicle system 155, the keyless device 100 then transmits a response signal back to the vehicle system 155 wherein the response signal may carry information of the preset configuration for the authorized user. Then, after receiving such response signal, the vehicle system 155 automatically launches the user's configuration defined in the keyless device 100 into the vehicle system 155 to configure the setting of the particular vehicle equipment device. In addition, it should be noted that in other embodiments the user may not need to reconfirm whether to transmit the preset configuration and the preset configuration can be automatically transmitted from the keyless device 100 to the vehicle system 155. Thus, by doing so, once a person such as a vehicle driver is identified as an authorized user by the keyless device 100, the settings of the in-car equipment devices can be automatically configured and adjusted in reply to the requirements of the person. For example, the car seats, in-car entertainment devices, and so on can be automatically adjusted in response to the requirements of the person. In addition, for example, the schedule lists recorded by the smart phone 100 can be launched from the smart phone 100 into the vehicle system to display the schedule lists on a display panel (not shown) of the vehicle system 155 for the vehicle driver.

Further, in other embodiments, the mobile electronic device 100 may be a wearable electronic device which can be set as the keyless device of the vehicle. If the mobile electronic device 100 to be used as keyless device is implemented by using the wearable electronic device such as the smart watch or smart bracelet, in addition to performing the above-mentioned operations, the detection module 105 of the wearable electronic device 100 can further perform a wrist-worn activity detection to repeatedly detect whether the wearable electronic device 100 is worn on a wrist of a person after the person is identified as an authorized user.

Once detecting that the wearable electronic device 100 is not worn on the wrist of the person, the processing circuit 110 is arranged to re-determine whether the person is an authorized user by comparing the PPG measurement signals with the PPG reference signals. If the wearable electronic device 100 is still worn on the wrist of the person, the processing circuit 110 is not arranged to reconfirm the identification of the person. In this situation, the wearable electronic device 100 is still configured as the keyless device whatever the wearable electronic device 100 is worn or not worn by the person. The identification of an authorized user is needed to be reconfirmed if the wearable electronic device 100 leaves the authorized user. The identification of an authorized user is not needed to be reconfirmed only if the wearable electronic device 100 is still worn on the authorized user.

Further, in other embodiments, a portable electronic device can be arranged to identify or recognize whether a person is an authorized user, and a wearable electronic device can be used as a keyless device; for example, the portable electronic device may be the user's smart phone, and the wearable electronic device may be the user's smart watch or smart bracelet (but not limited). The wearable electronic device may be a smart watch or a smart bracelet. The wearable electronic device can exchange security information with the portable electronic device by establishing a security connection between the wearable electronic device and portable electronic device.

The portable electronic device is used to identify whether a person is an authorized user by performing finger print detection, face recognition, gesture recognition, and/or password identification; this is not limited to physiological information recognition. If the portable electronic device identifies that a person is an authorized user as well as the wearable electronic device is currently worn by such person, then the wearable electronic device can automatically become a keyless device of the vehicle.

In addition, the wearable electronic device may record and carry a specific setting dedicated for a specific user wherein the specific setting may comprise seat adjustment, music preference, air condition adjustment, and so on. Since a person may have two or more vehicles but only one wearable electronic device, the wearable electronic device can be configured to record and carry different settings of different vehicles such as a compact car and a wagon for the same person.

Figure 2:
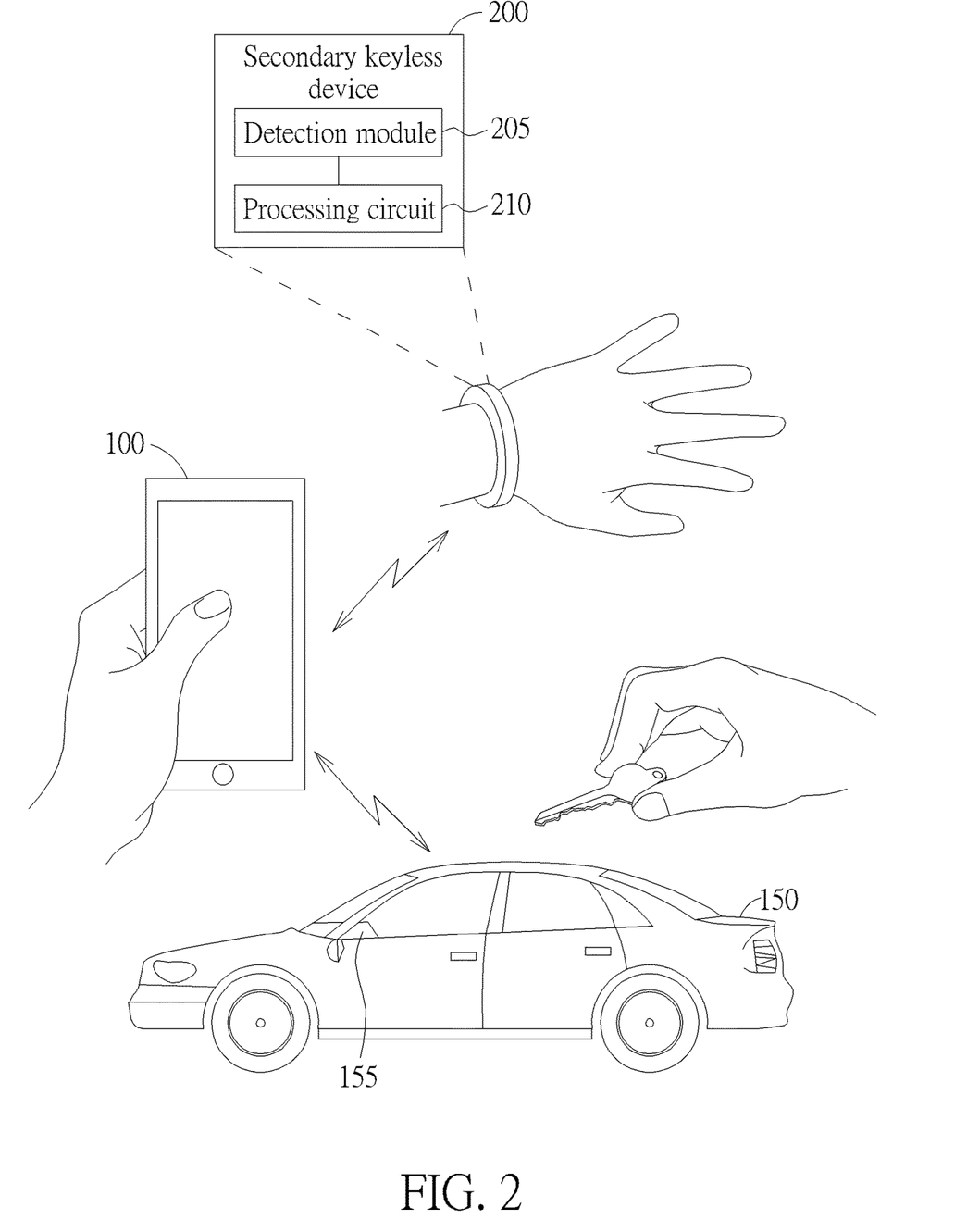
FIG. 2 is a diagram showing an authorized user using the smart phone of FIG. 1 to configure a wearable electronic device as a keyless device according to an embodiment of the invention.

The wearable electronic device may merely need to perform the wrist-worn activity detection to ensure security without detecting the physiological feature of the user again. FIG. 2 is a diagram showing an authorized user using the smart phone 100 to configure his wearable electronic device 200 as a keyless device according to an embodiment of the invention. As shown in FIG. 2, similar to FIG. 1, the smart phone 100 and the vehicle system 155 can form a first piconet to communicate with each other via Bluetooth communication standard wherein the vehicle system 155 is a master and the smart phone 100 is a slave. In addition, the smart phone 100 and the wearable electronic device 200 can form a different second piconet in which the smart phone 100 is a master and the wearable electronic device 200 is a slave. When the pairing procedure between the smart phone 100 and the vehicle system 155 successfully completes, the smart phone 100 can communicate with the vehicle system 155 via a security connection.

If the pairing procedure between the smart phone 100 and the wearable electronic device 200 successfully completes, the smart phone 100 can communicate with the wearable electronic device 200 via another security connection in the second piconet. The smart phone 100 can be arranged to transmit a control packet to the wearable electronic device 200 to set the wearable electronic device 200 as the keyless device for the vehicle system 155 when the smart phone 100 has identified that the person is the authorized user.

After that, the person can directly use the wearable electronic device 200 to open/start the vehicle 150 to replace the function of the physical car/automobile key without using the smart phone 100. Additionally, a person can be identified as the authorized user by the detection module 205 and processing circuit 210 of the wearable electronic device 200 as long as the wearable electronic device 200 is still worn on the wrist of the person.

It should be noted that in the embodiment of FIG. 2 the detection module 205 comprised by the wearable electronic device 200 is used to perform the wrist-worn activity detection for a person and does not need to generate PPG measurement signals that are used for identification recognition of the person. However, this is not meant to be a limitation. The detection module 205 of the keyless device 200 can also detect PPG measurement signals of the person, and the processing circuit 210 of the keyless device 200 can also compare the PPG measurement signals of the person with the PPG reference signals to re-determine or reconfirm whether the person is the authorized user.

Further, in other embodiments, the controlling circuit 103 of FIG. 1 can be installed within an in-car equipment device in the vehicle system 155. The vehicle system 155 may comprise multiple in-car equipment devices wherein the controlling circuit 103 is installed with a specific in-car equipment device such as a steering wheel. For example, the detection module 105 can be configured on the steering wheel. In addition, the operations and functions of detection module 105 and processing circuit 110 are identical and not detailed again. After a person uses the physical car/automobile key to open the car door of the vehicle 150, the person may hand on the steering wheel to drive the vehicle 150, and the detection module 105 and processing circuit 110 can be used to re-determine or reconfirm the identification of such person sitting on the driver's seat to provide an additional vehicle drive away protection. Only if the person is the authorized user, the vehicle system 155 enters the drive mode and the person can drive the vehicle 150.

Further, in one embodiment, a replica of controlling circuit 103 of FIG. 1 can be installed within an in-car equipment device in the vehicle system 155. The vehicle system 155 may comprise multiple in-car equipment devices wherein the controlling circuit 103 is installed with a specific in-car equipment device such as a steering wheel. For example, the detection module 105 can be configured on the steering wheel. In addition, the operations and functions of detection module 105 and processing circuit 110 are identical and not detailed again. After a person uses the keyless device 100 open the car door of the vehicle 150, the person hands on the steering wheel to drive the vehicle 150, and the detection module 105 and processing circuit 110 can be used to re-determine or reconfirm the identification of such person sitting on the driver's seat to provide an additional vehicle drive away protection. Only if the person is the authorized user, the vehicle system 155 enters the drive mode and the person can drive the vehicle 150.

Further, in one embodiment, when the electronic device 100 of a vehicle driver is a wearable device and is successfully paired with the processor of the vehicle system 155, the processing circuit 110 of the wearable electronic device 100 can be arranged to detect the power level of the transmission signal sent from the vehicle system 155 to the wearable electronic device 100. For example, the wearable electronic device 100 is paired with the vehicle system 155 via the Bluetooth communication standard, and the processing circuit 110 is arranged to monitor the power of Bluetooth signals/packets sent from the vehicle system 155 after the wearable electronic device 100 is configured as a keyless device for the vehicle system 155. If the power magnitude is lower than a specific power threshold, the processing circuit 110 determines that the distance between the wearable electronic device 100 and steering wheel is longer than a distance threshold and thus decides that the hands of the vehicle driver are not placed on the steering wheel. In this situation, the processing circuit 110 of the wearable electronic device 100 may generate an alarm signal, sound, vibration to the driver to wake up the driver. Alternatively, the processing circuit 110 may send an alarm signal to the processor of the vehicle system 155 so that the vehicle system 155 can also generate an alarm sound to the driver to wake up the driver. Alternatively, the processing circuit 110 can start auto-dialing to call an emergency number and/or transmit a GNSS location message with a help message to the other persons.

Further, in other embodiments, a vehicle driver can configure his keyless device paired with the vehicle system 155 to automatically and remotely control household electronic devices or equipment devices based on the GNSS location information of the vehicle 150 or the keyless device. For example, the vehicle driver configures a setting of auto start household electronics/appliances and records such setting information in the keyless device such as the driver's smart phone 100. When the driver is driving the vehicle 150, the smart phone 100 is paired with the vehicle system 155. The vehicle system 155 for example comprises a car navigation system which can be used to display a suggested route from a current GNSS location to the driver's house for the driver. The processing circuit 110 of the smart phone 100 is arranged to repeatedly retrieve GNSS information from the vehicle system 155 via the Bluetooth security connection or a wire connection wherein the GNSS information comprises the suggested route and the current GNSS location information. Based on the suggested route and the current GNSS location information, the processing circuit 110 can decide whether the current GNSS location approaches a target location such as a specific intersection set by the driver. If the vehicle 150 approaches the target location, the processing circuit 110 is arranged to send a control signal to start and control the household electronics/appliances.

Alternatively, based on the suggested route and the current GNSS location information, the processing circuit 110 can calculate a vehicle speed and derive how many minutes left to arrive at the driver's house according to the calculated vehicle speed. The processing circuit 110 then compare the left minutes with a time threshold. If the minutes are shorter than the time threshold, the processing circuit 110 is arranged to send a control signal to start and control the household electronics/appliances.

Alternatively, based on the suggested route and the current GNSS location information, the processing circuit 110 can calculate a distance between the current location and a destination location and compare the distance with a distance threshold. If the distance is shorter than the distance threshold, the processing circuit 110 is arranged to send a control signal to start and control the household electronics/appliances.

In addition, the authorized user can set the mobile electronic device 100 as the keyless device to earlier activate or unlock a portion of a security system at a specific location when the authorized user is driving the vehicle 150 and the vehicle 150 approaches the specific location. For example, in addition to being paired with the vehicle system 155, the mobile electronic device 100 can be paired with a home security system of the user's house via a wireless security connection. The pairing procedure between the mobile electronic device 100 and home security system may be similar to the above-mentioned pairing procedure using the Bluetooth communication or may be completed by using different wireless communication technologies. When the user is driving the vehicle 150 to the user's house, the mobile electronic device 100 as the keyless device can retrieve the suggested route and the current GNSS location information from the vehicle system 155, and then can calculate the vehicle speed, the distance left, and the minutes left and so on to determine whether the vehicle 150 approaches to the user's house. If the vehicle 150 approaches to the user's house, the processing circuit 110 can be arranged to trigger the home security system and may control the system to unlock the door of the house early and automatically, open the door of entrance of an underground parking lot early and automatically, turn on the light of the parking lot or turn the light brighter early and automatically, or other portions which can be controlled by the home security system. The authorized user can use the keyless device 100 if successfully paired with the home security system to automatically activate the operation of a portion of the home security system.

In addition, the vehicle driver's keyless device 100, e.g. his smart phone, can be arranged to output and transmit display information to the vehicle 150 so that the vehicle system 155 can display the display information on its display panel. The vehicle driver can operate the display panel to input user commands to the vehicle system 155 and the vehicle system 155 transmits the user commands to the keyless device 100, i.e. the smart phone, via the Bluetooth security connection.

Figure 3:
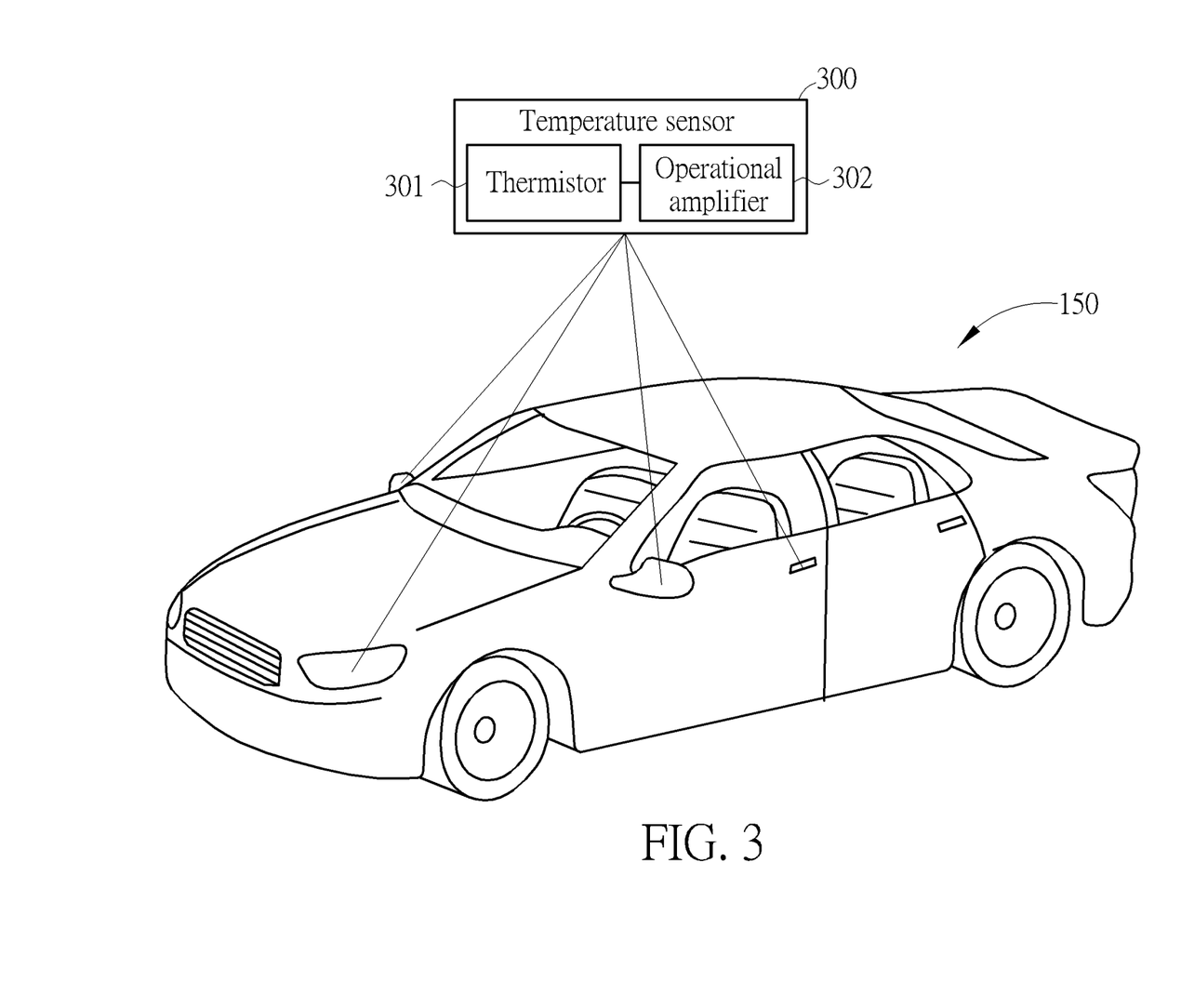
FIG. 3 is a block diagram of the temperature sensor configured at portion(s) of car exterior device (s) comprised by the vehicle of FIG. 1 according to an embodiment of the invention.

FIG. 3 is a block diagram of the temperature sensor 300 configured at portion(s) of car exterior device (s) comprised by the vehicle 150 according to an embodiment of the invention. The vehicle 150 may comprise the temperature sensor 300 which is configured at portion (s) of car exterior device (s) to detect an outside temperature, and the vehicle system 155 receives and uses the detected outside temperature to adaptively control or adjust the temperature of an in-car air conditioner so that an authorized user does not experience a large fluctuation in temperature between the outside environment of the vehicle and the in-car environment. The temperature sensor 300 for example comprises a thermistor 301 and an operational amplifier 302 wherein the thermistor's one end is coupled to one input of the operational amplifier which can generate a sensor output as a temperature control signal. The car exterior device for example comprises at least one of door handle(s), side mirrors, a neighborhood of the license plate, headlight, and so on; this is not intended to be a limitation. As shown in FIG. 3, the temperature sensor 300 can be installed within the headlight, the side mirrors, and/or door handles.

In practice, when an authorized user uses a keyless device to open and/or start the vehicle, the processing circuit 110 of the keyless device 100 is arranged to send a notification signal to the vehicle system 155 via the Bluetooth security communication, and the processor of the vehicle system 155 is arranged to send a temperature request signal to the temperature sensor 300 configured at the car exterior device to ask the temperature sensor transmit back the sensed outside temperature. When receiving the information of the sensed outside temperature, the processor of vehicle system 155 is arranged to adjust the temperature of an in-car air conditioner to dynamically or adaptively control the temperature difference between the in-car temperature and outside temperature to be smaller than a temperature threshold.

In addition, the authorized user can control or adjust the temperature of the in-car air conditioner before such user opens the car door of the vehicle 150 so that the in-car temperature has been adjusted to a comfortable temperature when authorized user opens the car door. In practice, a person can use the keyless device 100 to identify the person is the authorized user and then to send a Bluetooth control signal or another wireless control signal to the vehicle system 155 so as to earlier adjust the in-car temperature of the in-car air conditioner based on the outside temperature detected by the temperature sensor 300 mentioned above.

Further, in one embodiment, the operational amplifier 302 of the temperature sensor 300 is arranged to generate a temperature control signal to a processor of the vehicle system to make the processor adjust an in-car temperature of the air conditioner within the vehicle 150 based on the temperature control signal which determines a difference between a specific temperature corresponding to a driver of the vehicle system and the in-car temperature. For example, the specific temperature is the driver's body temperature, and the temperature sensor 300 is arranged to make the processor adjust the in-car temperature of the air conditioner based on the difference between the driver's body temperature and the in-car temperature after the driver has been identified as an authorized user.

For example, the difference is a comfortable temperature difference for the driver in other air condition environment, and the temperature sensor 300 is arranged to make the processor adjust the in-car temperature of the air conditioner based on the comfortable temperature difference after the driver has been identified as an authorized user.

Further, in one embodiment, an electronic device comprised by a portable device such as a smart phone or comprised by a vehicle system of the vehicle can be used for double checking whether a person is an authorized after the person uses a keyless device to open a door of the vehicle. The electronic device comprises the controlling circuit 103 which comprise the physiological feature detection module 105 and the processing circuit 110 coupled to the physiological feature detection module 105. The processing circuit 110 is used for determining whether the person is the authorized user of the vehicle according to the detected physiological feature of the person, and then used for determining to start the vehicle or activating an in-car equipment of the vehicle only when the person is identified by the processing circuit as the authorized user as well as the person uses the keyless device to start the vehicle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wearable electronic device to be used as a keyless device of a vehicle, wherein the wearable electronic device comprises:
a detection module to perform an activity detection upon an authorized person which has been authorized by the wearable electronic device;
wherein the wearable electronic device is performed as a keyless device to open a car door and start the vehicle according to a result of the activity detection after a personal identification is performed by the wearable electronic device; the car door of the vehicle is opened or the vehicle is started without requiring a personal identification of a smart phone when both conditions are satisfied wherein the both conditions are that the authorized person, which has been authorized by the wearable electronic device, uses the wearable electronic device performing a physiological feature detection upon the authorized person to reconfirm the authorized person and the authorized person uses the wearable electronic device, which is continuously worn on the person and not taken off, acting as the keyless device: the wearable electronic device is configured as the keyless device of the vehicle to earlier activate or unlock a portion of a security system at a specific location in response to an event that the authorized person is driving the vehicle and the vehicle approaches the specific location.

2. The wearable electronic device of claim 1, wherein the wearable electronic device is paired with a vehicle system of the vehicle and is paired with a home security system of the authorized person's house via a wireless security connection.

3. The wearable electronic device of claim 2, wherein the wearable electronic device acting as the keyless device is arranged to retrieve a suggested route and a current GNSS location information from the vehicle system to determine whether the vehicle approaches to the authorized person's house.

4. The wearable electronic device of claim 3, wherein, when the vehicle approaches to the authorized person's house, the wearable electronic device is arranged to trigger the home security system so as to control the home security system unlocking a door of the authorized person's house early and automatically, opening a door of an entrance of an underground parking lot early and automatically, turning on a light of the parking lot, turning the light brighter early and automatically, or executing a different portion which is controlled by the home security system.

5. The wearable electronic device of claim 2, wherein a pairing procedure between the wearable electronic device and the home security system employs a Bluetooth communication or a wireless communication.

6. The wearable electronic device of claim 5, wherein, when the pairing procedure is successfully established, the wearable electronic device is arranged to automatically activate an operation of a portion of the home security system based on a control of the authorized person.

* * * * *